United States Patent
Ohori et al.

(10) Patent No.: US 7,906,607 B2
(45) Date of Patent: Mar. 15, 2011

(54) ISOCYANATE GROUP-TERMINATED URETHANE PREPOLYMER, PROCESS FOR PRODUCING THE SAME, AND ADHESIVE COMPRISING THE URETHANE PREPOLYMER

(75) Inventors: Tomeyoshi Ohori, Ibaraki (JP); Hiroshi Wada, Ibaraki (JP)

(73) Assignee: Asahi Glass Company, Limited, Tokyo (JP)

( * ) Notice: Subject to any disclaimer, the term of this patent is extended or adjusted under 35 U.S.C. 154(b) by 78 days.

(21) Appl. No.: 11/876,200

(22) Filed: Oct. 22, 2007

(65) Prior Publication Data

US 2008/0210132 A1    Sep. 4, 2008

Related U.S. Application Data

(63) Continuation of application No. PCT/JP2006/308182, filed on Apr. 19, 2006.

(30) Foreign Application Priority Data

Apr. 22, 2005 (JP) ................ P.2005-125131

(51) Int. Cl.
 C08G 18/12 (2006.01)
 C08G 18/42 (2006.01)
 C08G 18/44 (2006.01)
 C08G 18/76 (2006.01)
 C09J 175/06 (2006.01)

(52) U.S. Cl. .............. 528/59; 252/182.2; 252/182.22; 528/83; 528/905; 560/25; 560/26; 560/359

(58) Field of Classification Search .......... 528/59, 528/83, 905; 560/25, 26, 115, 158, 359; 252/182.2, 182.22

See application file for complete search history.

(56) References Cited

U.S. PATENT DOCUMENTS

| | | | | |
|---|---|---|---|---|
| 4,996,283 A * | 2/1991 | Greco et al. | ............... | 528/80 |
| 4,999,407 A | 3/1991 | Gilch et al. | | |
| 5,100,995 A * | 3/1992 | Munzmay et al. | ............... | 528/45 |
| 5,175,228 A * | 12/1992 | Wang et al. | ............... | 528/48 |
| 5,786,070 A * | 7/1998 | Higuchi et al. | ............... | 428/220 |
| 5,939,488 A | 8/1999 | Nowicki et al. | | |
| 6,087,463 A | 7/2000 | Tada et al. | | |
| 6,423,810 B1 * | 7/2002 | Huang et al. | ............... | 528/77 |
| 6,720,401 B2 | 4/2004 | Toyofuku et al. | | |
| 2006/0025555 A1 | 2/2006 | Ichihashi et al. | | |
| 2006/0281891 A1 | 12/2006 | Tsuge et al. | | |
| 2007/0088146 A1 | 4/2007 | Nakamura et al. | | |
| 2007/0191567 A1 | 8/2007 | Tsuge et al. | | |

FOREIGN PATENT DOCUMENTS

| | | |
|---|---|---|
| EP | 0 369 517 A1 | 5/1990 |
| EP | 1 550 695 A1 | 7/2005 |
| JP | 62-181375 | 8/1987 |
| JP | 2-16180 | 1/1990 |
| JP | 6-271832 | 9/1994 |
| JP | 7-17891 | 3/1995 |
| JP | 7-118622 | 5/1995 |
| JP | 10-259369 | 9/1998 |
| JP | 11-256131 | 9/1999 |
| JP | 2003-246830 | 9/2003 |
| JP | 2003-277717 | 10/2003 |
| JP | 2003-313531 | 11/2003 |
| JP | 2003-327647 | 11/2003 |
| JP | 2005-23181 | 1/2005 |
| WO | WO 2004/031296 | 4/2004 |

OTHER PUBLICATIONS

STN Registry for xylylene diisocyanate, RN 1014-98-8, 2010.*
Oertel; Polyurethane Handbook: Chemistry—Raw Materials—Processing—Applications—Properties; Hanser Publishers; New York; 1985; pp. 12-15.*
U.S. Appl. No. 12/632,209, filed Dec. 7, 2009, Nakamura, et al.
U.S. Appl. No. 12/757,071, filed Apr. 9, 2010, Tsuge, et al.

* cited by examiner

*Primary Examiner* — Rabon Sergent
(74) *Attorney, Agent, or Firm* — Oblon, Spivak, McClelland, Maier & Neustadt, L.L.P.

(57) ABSTRACT

It is an object of the present invention to provide an isocyanate group-terminated urethane prepolymer which has a low viscosity at melting and a process for producing the same, and an adhesive which comprises the urethane prepolymer. The invention relates to a process for producing an isocyanate group-terminated urethane prepolymer which comprises reacting polyols with a polyisocyanate compound, wherein the polyols comprise 10 to 50% by mass of a polyester polyol and 90 to 50% by mass of a polycarbonate polyol and wherein a sebacic acid-derived polyester polyol which is a polycondensate of sebacic acid with a diol compound accounts for 50 to 100% by mass of the polyester polyol and wherein the polyisocyanate compound and the polyols are reacted in such amounts that the ratio (by mol) of the isocyanate group/hydroxyl group is 1.2 to 3.2.

14 Claims, No Drawings

ISOCYANATE GROUP-TERMINATED URETHANE PREPOLYMER, PROCESS FOR PRODUCING THE SAME, AND ADHESIVE COMPRISING THE URETHANE PREPOLYMER

TECHNICAL FIELD

The present invention relates to an isocyanate group-terminated urethane prepolymer and a process for producing the same, and an adhesive comprising the urethane prepolymer.

BACKGROUND ART

Heretofore, non-solvent-type moisture curable adhesives containing an isocyanate group-terminated urethane prepolymer as a main component have been known. Furthermore, as one kind of this type of the adhesives, there is known a hot-melt-type moisture curable adhesive (hereinafter also simply referred to as "reactive hot-melt adhesive") which is paste or solid at room temperature and has the property of melting at the time when heated. The reactive hot-melt adhesive has characteristics that, in the case that substrates are coated with the adhesive melted by heating and the substrates are adhered each other, such an initial adhesive force that can fix the substrates each other is generated by cooling and solidifying the adhesive, the substrates are hardly shifted each other, and thereafter, a strong adhesive force can be exhibited by moisture curing of the adhesive.

Moreover, in the case that adhesion of textile products is purposed in clothing applications and the like, it is required for the reactive hot-melt adhesive that workability is excellent in the step of melting the reactive hot-melt adhesive and applying it to substrates (e.g., viscosity of the reactive hot-melt adhesive when melted (melt viscosity) is an appropriate value and such an initial adhesive force that the substrates are hardly shifted each other can be exhibited), the adhered part is excellent in sweat-deterioration resistance and hydrolysis resistance, and a touch and a feel of the adhered textile products, i.e., texture as clothing, are good.

As reactive hot-melt adhesives using a polyester polyol as the raw material, there are heretofore known (a1) an adhesive using a urethane prepolymer obtainable by reacting a high-molecular-weight (about 4,000 to about 11,000) polyester diol with a polyisocyanate compound, as a reactive hot-melt adhesive for clothing using an isocyanate group-terminated urethane prepolymer (e.g., see Patent Document 1); (a2) an adhesive using a urethane prepolymer obtainable by reacting a polyester diol having a hydroxyl value-converted average molecular weight of about 700 to 2,500 and a polyester diol having a hydroxyl value-converted average molecular weight of about 1,000 to 3,500 with a polyisocyanate compound (e.g., see Patent Document 2); (a3) an adhesive using a urethane prepolymer obtainable by reacting a crystalline polyester diol having a hydroxyl value-converted average molecular weight of 3,000 to 10,000 and a crystalline polyester diol having a hydroxyl value-converted average molecular weight of 1,000 to 3,000 with a polyisocyanate compound (e.g., see Patent Document 3); and (a4) an adhesive using a prepolymer obtainable by reacting a crystalline polyester diol with a polyisocyanate compound and further reacting the resulting isocyanate group-terminated urethane prepolymer with a low-molecular-weight diol (e.g., see Patent Document 4).

Moreover, as the adhesives obtained using a polycarbonate polyol as a raw material, there are heretofore known (b1) a reactive hot-melt adhesive comprising a combination of a polycarbonate-based urethane prepolymer and a saturated polyester resin (e.g., see Patent Document 5); (b2) a moisture curable adhesive obtainable by forming an isocyanate group-terminated urethane prepolymer using a specific polycarbonate polyol as a raw material and further reacting the resulting prepolymer with a low-molecular-weight diol or diamine, as an adhesive having improved deterioration resistance against oleic acid (this is referred to as sweat-deterioration resistance) and hydrolysis resistance against an aqueous lactic acid solution (e.g., see Patent Document 6); and (b3) a non-solvent-type moisture curable hot-melt urethane resin composition comprising a urethane polymer wherein content of a polycarbonate polyol in whole polyol components is 20% by weight or more, an amine-based catalyst, and water (e.g., see Patent Document 7).

Patent Document 1: JP-A-11-256131 (U.S. Pat. No. 5,939,488)
Patent Document 2: JP-A-62-181375
Patent Document 3: JP-A-7-118622
Patent Document 4: JP-A-6-271832
Patent Document 5: JP-B-7-17891
Patent Document 6: JP-A-2003-313531
Patent Document 7: JP-A-2003-246830

The adhesive of the above-mentioned (a1) has a characteristic of a fast solidifying speed but the melt viscosity is high and the workability is not sufficiently good. Moreover, the adhesive of the above-mentioned (a2) is excellent in flexibility and elasticity after curing and the resulting texture obtained when the fabrics and the like are adhered is good but the workability is not sufficiently good due to high melt viscosity. Furthermore, the adhesive of the above-mentioned (a3) is an adhesive for soft vinyl chloride resin sheets having low thermal resistance and is not necessarily suitable for use in textile substrates. The adhesive of the above-mentioned (a4) exhibits a high adhesive force at the initial stage of curing but has a disadvantage that, when the isocyanate group-terminated urethane prepolymer is reacted with a low-molecular-weight diol, the urethane prepolymer solidifies and then is not melted in some cases and, even when it can be melted, temperature for melting should be elevated to extremely high temperature. In addition, reactive hot-melt adhesives using these known isocyanate group-terminated polyester-based urethane prepolymers are insufficient in deterioration resistance against oleic acid (sweat-deterioration resistance) and hydrolysis resistance against an aqueous lactic acid solution.

Moreover, the adhesive of the above-mentioned (b1) is excellent in moisture resistance (hydrolysis resistance) and adhesiveness but heating and melting at high temperature are necessary in order to control viscosity to a value capable of easily coating on the substrates, so that the adhesive is poor in workability. Furthermore, in the adhesive of the above-mentioned (b2), when the isocyanate group-terminated urethane prepolymer is reacted with a low-molecular-weight diol or diamine, the urethane prepolymer solidifies and then is not melted in some cases and, even when it can be melted, the temperature for melting should be elevated to extremely high temperature, so that the adhesive is poor in workability. The adhesive of the above-mentioned (b3) has disadvantages of high melt viscosity and poor workability and also the deterioration resistance against oleic acid (sweat-deterioration resistance) is not sufficient in many cases depending on specific polyol blend content.

DISCLOSURE OF THE INVENTION

Problems to be Solved by the Invention

It is an object of the present invention to provide a hot-melt moisture-curable adhesive (reactive hot-melt adhesive)

which exhibits a relatively low temperature required for melting, is excellent in workability as a hot-melt adhesive since melt viscosity is relatively low, also is excellent in sweat-deterioration and hydrolysis resistance after moisture curing, and has a good texture after curing (e.g., a feel when touched with hand) in the case of use for adhesion of textile products, as well as an isocyanate group-terminated urethane prepolymer for use in the adhesive and a process for producing the same.

Means for Solving the Problems

The process for producing an isocyanate group-terminated urethane prepolymer of the invention comprises reacting polyols with a polyisocyanate compound, wherein the polyols comprise 10 to 60% by mass of a polyester polyol and 90 to 40% by mass of a polycarbonate polyol and a sebacic acid-derived polyester polyol which is a polycondensate of sebacic acid with a diol compound accounts for 50 to 100% by mass of the polyester polyol and wherein the polyisocyanate compound and the polyols are reacted in such amounts that the ratio (by mol) of the isocyanate group/hydroxyl group is 1.2 to 3.2.

Furthermore, in the above process, it is preferable that the hydroxyl value-converted average molecular weight of the polyester polyol is 1,500 to 5,000. Moreover, it is preferable that the hydroxyl value-converted average molecular weight of the polycarbonate polyol is 600 to 1,500. In addition, it is preferable that the polyisocyanate compound is 4,4'-diphenylmethane diisocyanate.

The isocyanate group-terminated urethane prepolymers obtainable using each of the above processes preferably have a melting point of from 40° C. to lower than 60° C. and a melt viscosity at 60° C. of 50,000 mPa·s or less.

The adhesive of the invention contains the isocyanate group-terminated urethane prepolymer having a melting point of from 40° C. to lower than 60° C. and a melt viscosity at 60° C. of 50,000 mPa·s or less as a main component. Furthermore, the invention relates to a moisture-curable adhesive comprising the isocyanate group-terminated urethane prepolymer as a main component. Moreover, the invention relates to a two-component-type adhesive comprising: a main agent component containing the isocyanate group-terminated urethane prepolymer; and a curing agent component. In addition, the adhesive is preferably an adhesive for use in clothing applications.

ADVANTAGE OF THE INVENTION

When the isocyanate group-terminated urethane prepolymer produced by using the process of the invention is used as a reactive hot-melt adhesive, an adhesive excellent in sweat-deterioration resistance and hydrolysis resistance is obtained and also has a characteristic of good texture even after curing in the case where it is used for adhesion of textile substrates. Furthermore, in the process for producing the isocyanate group-terminated urethane prepolymer of the invention, the isocyanate group-terminated urethane prepolymer produced using the polyester polyol having a hydroxyl value-converted average molecular weight of 1500 to 5000 and the polycarbonate polyol having a hydroxyl value-converted average molecular weight of 600 to 1500 and using 4,4'-diphenylmethane diisocyanate as the polyisocyanate compound is particularly excellent in sweat-deterioration resistance and hydrolysis resistance when it is used as an adhesive and also exhibits a good texture after curing when it is used for adhesion of textile substrates. Furthermore, the isocyanate group-terminated urethane prepolymer having a melting point of 40° C. to lower than 60° C. and a melt viscosity at 60° C. of 50,000 mPa·s or less obtained by the process for producing the isocyanate group-terminated urethane prepolymer of the invention has characteristics, that is, workability is extremely good in the case where it is used as a reactive hot-melt adhesive; initial adhesiveness is good and the substrates themselves are hardly shifted each other when the adhesive is heated and melted and applied to substrates, then the substrates are adhered each other, and they are cooled to room temperature; and extremely excellent adhesive force is obtained after the adhesive is moisture-cured.

The present inventors have found that an isocyanate group-terminated urethane prepolymer obtainable by reacting a polyol component containing a polyester polyol containing 50% by mass or more of a sebacic acid-based polyester polyol and a polycarbonate polyol in respective specific ratios is excellent as a reactive hot-melt adhesive. Namely, the inventors have found that the sweat-deterioration resistance and hydrolysis resistance of the adhesive after curing can be made high in the case where such an isocyanate group-terminated urethane prepolymer is used as an adhesive, furthermore melt viscosity of the isocyanate group-terminated urethane prepolymer can be made low, the adhesive layer can be made thin in the case where it is applied on the surface of textile substrates by coating or the like means, also infiltration into the substrate is small owing to rapid solidification of the adhesive, and hence texture of the resulting textile products is excellent after curing of the adhesive. Thus, they have accomplished the invention.

BEST MODE FOR CARRYING OUT THE INVENTION

The isocyanate group-terminated urethane prepolymer of the invention is produced by reacting polyols with a polyisocyanate compound under such a condition that an excessive isocyanate group is present. The following will describe the polyols and the polyisocyanate compound for use in the invention.

(Polyols)

The polyols for use in the invention comprise a polyester polyol in an amount of 10 to 60% by mass thereof and a polycarbonate polyol in an amount of 90 to 40% by mass thereof. Furthermore, a sebacic acid-derived polyester polyol, which is a polycondensate of sebacic acid with a diol compound, accounts for 50 to 100% by mass of the polyester polyol.

(Polyester Polyol)

The polyester polyol for use in the invention contains 50 to 100% by mass of the sebacic acid-based polyester polyol as an essential component. The sebacic acid-based polyester polyol for use in the invention is preferably bifunctional. Preferred is one produced by polycondensation of sebacic acid with a diol compound. The raw material diol compound for use in the polycondensation into the sebacic acid-based polyester polyol is not particularly limited but it is preferable to use a single compound or a mixture of two or more compounds selected from the group consisting of ethylene glycol, diethylene glycol, propylene glycol, 1,3-propanediol, 2-methyl-1,3-butanediol, 1,4-butanediol, neopentyl glycol, 1,5-pentanediol, 2-methyl-1,5-pentanediol, 3-methyl-1,5-pentanediol, 1,6-hexanediol, 2,2,4-trimethyl-1,6-hexanediol, 3,3,5-trimethyl-1,6-hexanediol, 2,3,5-trimethylpentanediol, 1,9-nonanediol, 2-methyl-1,8-octanediol, decanediol, and dodecanediol. 1,4-Butanediol and/or 1,6-hexanediol are preferred and 1,6-hexanediol is particularly preferred.

An adhesive containing the isocyanate group-terminated urethane prepolymer of the invention obtainable using a polyester polyol obtainable by polycondensation of 1,4-butanediol and/or 1,6-hexanediol with sebacic acid is preferred due to excellent sweat-deterioration resistance and hydrolysis resistance after curing. Particularly preferred is to use a polyester polyol obtainable by polycondensation of 1,6-hexanediol with sebacic acid. Since a sebacic acid-based polyester polyol has an appropriate crystallinity and is also excellent in hydrolysis resistance, texture of the adhesive of the invention after curing can be made excellent and hydrolysis resistance and sweat-deterioration resistance can be made good by using the polyol as at least a part of polyols.

In the case of use in the invention, the hydroxyl value-converted average molecular weight of the sebacic acid-based polyester polyol is preferably 1500 to 5000, more preferably 1500 to 4000. By controlling the hydroxyl value-converted average molecular weight of the sebacic acid-based polyester polyol to be used to 5000 or less, melt viscosity of the adhesive using the resulting isocyanate group-terminated urethane prepolymer can be regulated to an appropriately low value and an adhesive which is capable of being easily performing application to a substrate, e.g., coating, and also has a good sweat-deterioration resistance can be obtained. On the other hand, by controlling the hydroxyl value-converted average molecular weight of the sebacic acid-based polyester polyol to be used to 1500 or more, the hydrolysis resistance of the resulting adhesive can be enhanced and also modulus of the adhesive after curing can be maintained appropriately low, so that an adhesive having a good texture can be obtained.

Incidentally, in the description, the hydroxyl value-converted average molecular weight of a polyol means a value obtained by calculation using the following equation:

Hydroxyl value-converted average molecular weight=
(56100/Hydroxyl value)×Average number of
functional groups based on the hydroxyl value (mgKOH/g) of the polyol and an average number of functional groups per molecule of the polyol. For example, the average number of functional groups per molecule of the polyol herein is 2 in the case of a polyester polyol produced using a dicarboxylic acid and a diol alone. Furthermore, in the case of using a component other than a bifunctional component, such as a triol as a part of the raw materials, the number may be a value other than 2 and the average number of functional groups can be easily determined by calculation based on the number of functional groups and amount to be used (molar basis) of each raw material to be used.

In the invention, if desired, the other polyester polyol may be used in combination with the sebacic acid-based polyester polyol in a range without impairing the advantages of the invention. The other polyester polyol is preferably bifunctional and examples thereof include polyester polyols obtainable by polycondensation of at least one dibasic acid selected from aliphatic dibasic acids such as succinic acid, glutaric acid, adipic acid, pimelic acid, suberic acid, azelaic acid, sebacic acid, and dodecanedioic acid; aromatic dibasic acids such as isophthalic acid, terephthalic acid, naphthalenedicarboxylic acid with a diol (diol can be selected from the diols mentioned as raw materials of the sebacic acid-based polyester polyol; and polylactone diols such as poly-ε-caprolactone diol and poly-β-methyl-δ-valerolactone diol obtainable by ring-opening polymerization of lactones selected from ε-caprolactone, β-methyl-δ-valerolactone, and the like. The hydroxyl value-converted average molecular weight of the other polyester polyol is preferably 1500 to 5000 more preferably 1500 to 4000.

In the invention, the sebacic acid-based polyester polyol is used in an amount of 50 to 100% by mass, preferably 75 to 100% by mass, more preferably 90 to 100% by mass, and most preferably 100% by weight of the whole polyester polyol to be used. By using the sebacic acid-based polyester polyol as a main component of the polyester polyol, an adhesive having a low melt viscosity, having a high initial adhesive force between substrates in the case where it is cooled after application to the substrates, and having an excellent texture after curing can be obtained. Moreover, the hydroxyl value-converted average molecular weight of the whole polyester polyol is preferably 1500 to 5000, more preferably 1500 to 4000. By controlling the hydroxyl value-converted average molecular weight of the polyester polyol to 5000 or less, the melt viscosity of the adhesive using the resulting isocyanate group-terminated urethane prepolymer can be regulated to an appropriately low value and an adhesive which is capable of being easily performing application to a substrate, e.g., coating, and also has a good sweat-deterioration resistance can be obtained. On the other hand, by controlling the hydroxyl value-converted average molecular weight of the polyester polyol to 1500 or more, the hydrolysis resistance of the resulting adhesive can be enhanced and also the modulus of the adhesive after curing can be maintained appropriately low, so that an adhesive having a good texture can be obtained.

(Polycarbonate Polyol)

In the invention, as the polyol for use in the production of the isocyanate group-terminated urethane prepolymer, a polycarbonate polyol is used together with the polyester polyol. As the polycarbonate polyol for use in the invention, a polycarbonate diol is preferred. The polycarbonate diol can be generally produced by reacting a diol compound with phosgene. As another process for producing the polycarbonate diol, there may be mentioned a process of polycondensation of a carbonate compound selected from the group consisting of dialkyl carbonates such as dimethyl carbonate or diethyl carbonate and diaryl carbonates such as diphenyl carbonate, and the like with a diol compound.

The diol compound for use in the production of the polycarbonate polyol includes ethylene glycol, 1,2-propanediol, 1,3-propanediol, 2-methyl-1,3-butanediol, 1,4-butanediol, neopentyl glycol, 1,5-pentanediol, 2-methyl-1,5-pentanediol, 3-methyl-1,5-pentanediol, 1,6-hexanediol, 2,2,4-trimethyl-1,6-hexanediol, 3,3,5-trimethyl-1,6-hexanediol, 2,3,5-trimethylpentanediol, 1,9-nonanediol, 2-methyl-1,8-octanediol, decanediol, dodecanediol, and the like. Moreover, together with the diol compound, a compound having three or more hydroxyl groups in one molecule, for example, a compound selected from trimethylolethane, trimethylolpropane, hexanetriol, pentaerythritol, and the like can be also used in such an amount that the resulting polycarbonate polyol is not gelled.

As the polycarbonate polyol for use in the production of the isocyanate group-terminated urethane prepolymer of the invention, it is preferred to use a crystalline polycarbonate polyol having a melting point of 30° C. or higher, which is produced using 1,6-hexanediol and/or 1,9-nonanediol as the diol compound. In the case where textile substrates are adhered using an adhesive containing the isocyanate group-terminated urethane prepolymer of the invention produced using the crystalline polycarbonate polyol having a melting point of 30° C. or higher, textile products having a good texture can be obtained.

In the invention, the polycarbonate polyols can be used singly or as a combination of two or more thereof.

The hydroxyl value-converted average molecular weight of the polycarbonate polyol for use in the invention is not particularly limited but is preferably 600 to 1500, and more preferably 800 to 1300. By using the polycarbonate polyol having a hydroxyl value-converted average molecular weight of 1500 or less, an adhesive having a low melt viscosity and capable of being easily performing application to substrates, e.g., coating, can be obtained. Moreover, by using the polycarbonate polyol having a hydroxyl value-converted average molecular weight of 600 or more, the modulus of the cured product of the resulting adhesive can be made low and thus an adhesive having a good texture can be obtained.

In the invention, as the polyols, the polyester polyol and the polycarbonate polyol are used in combination. On this occasion, the polyester polyol and the polycarbonate polyol are used in combination so that the polyester polyol accounts for 10 to 60% by mass, preferably 15 to 55% by mass of the whole polyols and the polycarbonate polyol accounts for 90 to 40% by mass, particularly preferably 85 to 45% by mass. By controlling the content of the polyester polyol in the whole polyols to 60% by mass or less, the melt viscosity of the adhesive of the invention can be made low and the application to substrates can be easily performed, and also the sweat-deterioration resistance of the adhesive after curing can be made excellent in the case where the substrates are adhered using the adhesive of the invention. Moreover, by controlling the content of the polyester polyol in the whole polyols to 10% by mass or more, an adhesive having a good texture after curing can be obtained. The hydroxyl value-converted average molecular weight of the whole polyols calculated based on the hydroxyl value-converted average molecular weights and molar fractions of the polyols used is preferably 1000 to 3500, and more preferably 1000 to 2500.

(Polyisocyanate Compound)

The isocyanate group-terminated urethane prepolymer of the invention can be obtained by reacting the polyols with a polyisocyanate compound. The polyisocyanate compound for use in the invention includes aromatic polyisocyanate compounds such as 4,4'-diphenylmethane diisocyanate (MDI), 2,4'-diphenylmethane diisocyanate, 2,4-tolylene diisocyanate, 2,6-tolylene diisocyanate, p-phenylene diisocyanate, tolidine diisocyanate, 1,5-naphthalene diisocyanate, and polymethylenepolyphenylene polyisocyanate (crude MDI); aralkyl polyisocyanate compounds such as xylylene diisocyanate and tetramethylxylylene diisocyanate; aliphatic polyisocyanate compounds such as 1,6-hexanethylene diisocyanate, 2,2,4-trimethylhexamethylene diisocyanate, lysine diisocyanate, and lysine triisocyanate; alicyclic polyisocyanate compounds such as isophorone diisocyanate, 4,4'-dicyclohexylmethane diisocyanate, and 2,5- and/or 2,6-norbornane diisocyanate; and various modified compounds of those polyisocyanate compounds. In the invention, the polyisocyanate compounds can be used singly or in combination of two or more thereof. As the polyisocyanate compound for use in the invention, since the sweat-deterioration resistance of the resulting adhesive cured product is good, aromatic polyisocyanate compounds are preferred and particularly, 4,4'-diphenylmethane diisocyanate, crude MDI, and modified compounds thereof are preferred. Since an adhesive having a high crystallinity and a thin color is obtained, 4,4'-diphenylmethane diisocyanate is particularly preferred.

(Isocyanate Group-Terminated Urethane Prepolymer)

The isocyanate group-terminated urethane prepolymer of the invention is obtained by reacting the polyols with the polyisocyanate compound under a condition that isocyanate groups are in excess of hydroxyl groups and in such a ratio that the isocyanate group/hydroxyl group (by mol) is 1.2 to 3.2, more preferably 1.5 to 3.0, particularly preferably 1.8 to 2.5. By controlling the molar ratio to 3.2 or less, the modulus of the cured product of the resulting adhesive can be made not too high and thus the product can be flexible, so that a product having a good texture of the adhered part is obtained when textile substrates are adhered using the adhesive. Moreover, by controlling the molar ratio to 1.2 or more, the viscosity of the resulting isocyanate group-terminated urethane prepolymer can be maintained appropriately low and the coating workability of the adhesive of the invention onto the substrate can be made superior as well as the sweat-deterioration resistance and hydrolysis resistance of the adhesive cured product can be made excellent.

The isocyanate group-terminated urethane prepolymer of the invention can be produced by reacting the polyols with the polyisocyanate compound and known processes for producing the isocyanate group-terminated urethane prepolymer can be used. The conditions for producing the isocyanate group-terminated urethane prepolymer of the invention are not particularly limited but specifically, there can be employed a process of mixing polyols and a polyisocyanate compound and stirring under heating at 40° C. to 100° C.

(Reaction Catalyst for Urethane Formation)

When the reaction of the polyols with the polyisocyanate compound, a known reaction catalyst for urethane formation can be also used. The catalyst includes organotin compounds such as dibutyltin dilaurate, bismuth salts of organic acids such as 2-ethylhexanoic acid and neodecanoic acid, and the like but is not limited thereto. Those skilled in the art can suitably select a preferable amount of the catalyst to be used.

(Properties of Isocyanate Group-Terminated Urethane Prepolymer)

The isocyanate group-terminated urethane prepolymer of the invention obtainable by the reaction of the polyols with the polyisocyanate compound preferably has a melting point of 40° C. to lower than 60° C. The melting point is a value determined from endothermic peak temperature measured by means of a differential scanning calorimeter (DSC) and the measuring method is described further in detail in Examples. In the case where the melting point of the isocyanate group-terminated urethane prepolymer is 40° C. or higher, since solidification of the adhesive of the invention is fast after the adhesive is melted under heating, applied to a textile substrate by coating, and cooled, so that the adhesive is hardly infiltrated into the textile substrate and hence the texture of adhered part of the substrate can be made good after curing the adhesive. Moreover, by controlling the melting point of the isocyanate group-terminated urethane prepolymer to lower than 60° C., it is not necessary to elevate the heating temperature for melting the adhesive to so high temperature, so that the adhesion operation is easy to perform. Furthermore, the isocyanate group-terminated urethane prepolymer of the invention has a melt viscosity at 60° C. of preferably 50,000 mPa·s or less, more preferably 40,000 mPa·s or less, and also preferably 10,000 mPa·s or more. In addition, the isocyanate group-terminated urethane prepolymer of the invention has a melt viscosity at 125° C. of preferably 3,000 mPa·s or less, more preferably 2,000 mPa·s or less, and also preferably 300 mPa·s or more. The melt viscosity at 60° C. is a value which is measured in accordance with the viscosity measuring method described in JIS K 1603 with maintaining a sample at 60° C. and the melt viscosity at 125° C. is a value measured by means of a cone plate viscometer. The detail is described in Examples. In the case where the polyols and the polyisocyanate compound in the preferable embodiment described above are reacted to form an isocyanate group-terminated urethane prepolymer, a urethane prepolymer having the above-described preferable melt viscosity is usually obtained. Furthermore, even when the isocyanate group-terminated urethane prepolymer initially obtained has a melt viscosity which slightly deviates from the above-described preferable melt viscosity, it is extremely easy for those skilled in the art to produce an isocyanate group-terminated urethane prepolymer having the above-described preferable melt viscosity by suitably regulating individual molecular weights, ratio, and isocyanate group/hydroxyl group (molar ratio) of the polyester polyol and polycarbonate polyol to be used.

(Physical Properties, Sweat-Deterioration Resistance, and Hydrolysis Resistance of Cured Product of Isocyanate Group-Terminated Urethane Prepolymer)

In the case where the isocyanate group-terminated urethane prepolymer of the invention is used for an adhesive for textile product applications, the cured product (polyurethane resin) obtained by moisture curing of the isocyanate group-terminated urethane prepolymer preferably has an elongation at break of 100 to 800%, a 100% modulus of 10 to 50 MPa, and a tensile strength of 10 to 80 MPa.

Moreover, with regard to the sweat-deterioration resistance of the cured product obtained by moisture curing of the isocyanate group-terminated urethane prepolymer of the invention, tensile strength retaining ratio is preferably 30% or more after the cured product is immersed in oleic acid at 80° C. for 70 hours. Also, with regard to the hydrolysis resistance of the cured product, tensile strength retaining ratio is preferably 30% or more after the cured product is immersed in aqueous lactic acid solution (concentration: 1% by mass) at 132° C. for 5 hours.

(Adhesive)

The adhesive of the invention essentially contains the isocyanate group-terminated urethane prepolymer as a main component. More preferably, the adhesive of the invention essentially consists of the isocyanate group-terminated urethane prepolymer. However, if desired, additive(s) commonly used in the technological field of urethane resins can be added. Examples of the additives usable include antiaging agents such as an antioxidant, a light stabilizer, and a UV absorbent, a colorant, a flame retardant, a tackifier, and the like. They can be used singly or in combination of two or more thereof.

The adhesive of the invention can be used as a so-called reactive hot-melt adhesive. Namely, in the case where the adhesive of the invention is applied to a substrate such as a textile product, the adhesive is applied to the substrate, for example, by a method of melting the adhesive under heating at a temperature of 60 to 125° C. and coating the same or the like method and then the substrates are attached each other, followed by moisture curing. The devices for application (coating) of the adhesive to the substrate include common applicators for hot-melt adhesives, e.g., a roll coater equipped with a heatable adhesive melting tank (gravure roll, reverse roll, etc.), a curtain coater, a nozzle, a spray, and the like. In the case of using the adhesive of the invention, when a textile product is used as a substance to be attached, flexibility of the material of the adhered part is impaired, a touch becomes hard, and texture of the product adhered becomes bad in some cases when the adhesive layer is too thick. Therefore, in the case of use for adhesion of textile products, the thickness of the adhesive layer at the coating onto the substrate is preferably 5 to 45 μm. In the case of adhering textile substrates, by controlling the thickness of the adhesive layer formed by the use of the invention to 45 μm or less, the texture of the product adhered can be kept good. Since the adhesive of the invention has a low melt viscosity, the thickness of the adhesive layer can be easily thinned in the case of application thereof by coating or the like means, and thereby, textile products having an excellent texture can be easily obtained.

The atmosphere in the tank for melting the adhesive is preferably replaced by an inert gas such as nitrogen gas so that the molten isocyanate group-terminated urethane prepolymer does not react with moisture present in the atmosphere in the tank for melting. For example, using the coating device, the adhesive of the invention is applied onto one side or both sides of the substrates to be attached and the substrates are attached each other through the adhesive before the adhesive is cooled and solidified. At the attaching, it is preferred to apply pressure onto the attached part. Furthermore, it is particularly preferred to continue the application of pressure until the adhesive is cooled and solidified so that the substrates to be attached do not shift each other.

The adhesive of the invention can be cured with a curing agent, instead of the moisture curing. Namely, it can be also used as a two-component type curable adhesive. As the curing agent usable, there may be mentioned compounds having 2 to 8 active hydrogen-containing functional groups in one molecule. As preferable curing agents, there may be mentioned relatively low-molecular-weight polyol, alkanolamine, and polyamine and particularly, a diol and/or a diamine is preferred. The molecular weight of the diol and/or diamine is preferably 400 or less, more preferably 300 or less, and particularly preferably 200 or less. Examples of the curing agent include bivalent alcohols such as ethylene glycol, diethylene glycol, propylene glycol, dipropylene glycol, 1,4-butanediol, neopentyl glycol, 1,5-pentanediol, 3-methyl-1,5-pentanediol, and 1,6-hexanediol; polyamines such as ethylenediamine, 1,2-propylenediamine, 1,3-propylenediamine, 1,4-tetramethylenediamine, 1,6-hexamethylenediamine, isophoronediamine, and 4,4'-cyclohexanediamine; alkanolamines such as N-methyldiethanolamine; and the like. The curing agents can be used singly or may be used in combination of two or more thereof. The amount of the curing agent to be used is preferably such an amount that the active hydrogen-containing functional group of the curing agent is 0.6 to 1.6 moles relative to one mole of the isocyanate group of the isocyanate group-terminated urethane prepolymer of the invention and more preferred is such an amount that the active hydrogen-containing functional group of the curing agent is 0.8 to 1.4 moles.

If desired, for adjusting viscosity, a solvent may be added to the adhesive of the invention. Moreover, the adhesive can be diluted with a solvent for use as a solution-type adhesive. The solvent to be used is not particularly limited and examples thereof include methyl ethyl ketone, toluene, ethyl acetate, and the like. The solvents can be used singly or as a mixed solvent of two or more thereof.

EXAMPLES

The following will specifically describe the present invention with reference to Examples and Comparative Examples. However, the invention is not limited thereto.

The raw materials used in the following Examples and Comparative Examples are as follows.

(Polyisocyanate Compound)

MDI: 4,4'-diphenylmethane diisocyanate (Millionate MT (trade name) manufactured by Nippon Polyurethane Industry Co., Ltd.)

(Polyols)

PHC1000: polyhexamethylene polycarbonate polyol, hydroxyl value-converted average molecular weight of 984, average number of hydroxyl group per molecule of 2 (Nippollan 981 (trade name) manufactured by Nippon Polyurethane Industry Co., Ltd.)

PHS3500: polyester polyol obtainable by polycondensation of 1,6-hexanediol and sebacic acid, hydroxyl value-converted average molecular weight of 3215, average number of hydroxyl group per molecule of 2 (URIC SE-3506 (trade name) manufactured by Itoh Oil Chemicals Co., Ltd.)

PHS2000: polyester polyol obtainable by polycondensation of 1,6-hexanediol and sebacic acid, hydroxyl value-converted average molecular weight of 2117, average number of hydroxyl group per molecule of 2 (URIC SE-2006 (trade name) manufactured by Itoh Oil Chemicals Co., Ltd.)

PHA4500: polyester polyol obtainable by polycondensation of 1,6-hexanediol and adipic acid, hydroxyl value-converted average molecular weight of 4878, average number of hydroxyl group per molecule of 2 (a pre-production sample manufactured by Dainippon Ink And Chemicals, Incorporated)

PNA2000: polyester polyol obtainable by polycondensation of nonanediol and adipic acid, hydroxyl value-converted average molecular weight of 2011, average number of hydroxyl group per molecule of 2 (N-2010 (trade name) manufactured by Kuraray Co., Ltd.)

PBA3000: polyester polyol obtainable by polycondensation of 1,4-butanediol and adipic acid, hydroxyl value-converted average molecular weight of 3024, average number of hydroxyl group per molecule of 2 (Polylite OD-X-2557 (trade name) manufactured by Dainippon Ink And Chemicals, Incorporated)

(Low-Molecular-Weight Compound)

1,5-pentanediol

Isocyanate group-terminated urethane prepolymers were produced using the above-described raw materials and then evaluated as adhesives. Hereinafter, the "part(s)" in connection with the amount of each raw material represents part(s) by mass.

(Production of Isocyanate Group-Terminated Urethane Prepolymers)

Example 1

Into a nitrogen-replaced reaction vessel was charged 133.8 parts of MDI, and then a mixed polyol of 183.1 parts of PHS3500 and 183.1 parts of PHC1000 (content of PHS3500 in the mixed polyol: 50% by mass) was added to MDI under stirring. After the addition was finished, the reaction mixture was heated at 80° C. for 1 hour under stirring to obtain an isocyanate group-terminated urethane prepolymer. An evaluation test was carried out using it as an adhesive.

Example 2

An isocyanate group-terminated urethane prepolymer was obtained in the same manner as in Example 1 except that the content of PHS3500 in the mixed polyol was changed from 50% by mass into 30% by mass. An evaluation test was carried out using it as an adhesive.

Example 3

An isocyanate group-terminated urethane prepolymer was obtained in the same manner as in Example 1 except that the content of PHS3500 in the mixed polyol was changed from 50% by mass into 20% by mass. An evaluation test was carried out using it as an adhesive.

Example 4

An isocyanate group-terminated urethane prepolymer was obtained in the same manner as in Example 1 except that PHS2000 was used instead of PHS3500 in the mixed polyol (the content of PHS2000 in the mixed polyol was 50% by mass). An evaluation test was carried out using it as an adhesive.

Comparative Example 1

An isocyanate group-terminated urethane prepolymer was obtained in the same manner as in Example 1 except that PHA4500 was used instead of PHS3500 in the mixed polyol (the content of PHA4500 in the mixed polyol was 50% by mass). An evaluation test was carried out using it as an adhesive.

Comparative Example 2

An isocyanate group-terminated urethane prepolymer was obtained in the same manner as in Example 1 except that PNA2000 was used instead of PHS3500 in the mixed polyol (the content of PNA2000 in the mixed polyol was 50% by mass). An evaluation test was carried out using it as an adhesive.

Comparative Example 3

An isocyanate group-terminated urethane prepolymer was obtained in the same manner as in Example 1 except that PBA3000 was used instead of PHS3500 in the mixed polyol (the content of PBA3000 in the mixed polyol was 50% by mass). An evaluation test was carried out using it as an adhesive.

Comparative Example 4

An isocyanate group-terminated urethane prepolymer was obtained in the same manner as in Example 1 except that the polycarbonate polyol PHC1000 alone was used instead of the mixed polyol (the content of a polyester polyol in the mixed polyol was 0%). An evaluation test was carried out using it as an adhesive.

Comparative Example 5

An isocyanate group-terminated urethane prepolymer was obtained in the same manner as in Example 1 except that the polyester polyol PHS3500 alone was used instead of the mixed polyol (the content of the polyester polyol in the mixed polyol was 100%). An evaluation test was carried out using it as an adhesive.

Comparative Example 6

An isocyanate group-terminated urethane prepolymer was obtained in the same manner as in Example 1 except that the polyester polyol PBA3000 alone was used instead of the mixed polyol (the content of the polyester polyol in the mixed polyol was 100%). An evaluation test was carried out using it as an adhesive.

Comparative Example 7

Into a nitrogen-replaced reaction vessel was charged 219.6 parts of MDI, and further 261.2 parts of PHC1000 was added to MDI under stirring. After the addition was finished, the reaction mixture was heated at 80° C. for 1 hour under stirring to effect a reaction. Subsequently, 19.2 parts of 1,5-pentanediol was added in a time as a chain extender and the whole was reacted under stirring for 10 minutes to obtain an isocyanate group-terminated urethane prepolymer. An evaluation test was carried out using it as an adhesive.

(Method for Evaluation Tests)

Evaluation as adhesives is carried out on the following items.

(1) Viscosity

The content of the isocyanate group in the isocyanate group-terminated urethane prepolymer was measured in accordance with the method described in JIS K 7301. The viscosity of the isocyanate group-terminated urethane prepolymer at 60° C. was measured in accordance with the method described in JIS K 1603 by means of a RE80 model viscometer manufactured by Toki Sangyo Co., Ltd. and the viscosity at 125° C. was measured by means of a cone plate viscometer manufactured by Research Equipment Limited.

(2) Melting Point

The melting point of the isocyanate group-terminated urethane prepolymer was measured by means of a differential scanning calorimeter (DSC) manufactured by SII NanoTechnology Inc. in the measuring range of −40° C. to 80° C. and temperature of an endothermic peak appearing at the measurement in a temperature-elevating rate of 5° C./min was determined as the melting temperature. When a plurality of peaks appeared, temperature of the endothermic peak at the most higher temperature side was determined as the melting temperature.

(3) Preparation of Polyurethane Film

A glass plate provided with a biaxially oriented polypropylene film (OPP film) thereon was heated from beneath by means of a heater set at 80° C. Then, the isocyanate group-terminated urethane prepolymer was placed on the heated OPP film to be melted and the molten isocyanate group-terminated urethane prepolymer was applied on the OPP film by means of an applicator. Owing to high viscosity at 60° C., the isocyanate group-terminated urethane prepolymer of Comparative Example 5 was applied on the OPP film while the heater was set at 100° C. Furthermore, since the isocyanate group-terminated urethane prepolymer of Comparative Example 7 exhibited no fluidity at 60° C., it was applied on the OPP film while the heater was set at 140° C. Subsequently, the prepolymer was allowed to stand under an atmosphere of 20° C. and 60% RH for 5 days to effect moisture curing and thereby, a polyurethane film having a thickness of about 100 μm was obtained. On the resulting polyurethane film, the following tensile properties, sweat-deterioration resistance, and hydrolysis resistance were evaluated.

(4) Tensile Properties

The elongation at break (%) ("Elongation" in Tables 1 to 3), 100% modulus (hereinafter abbreviated as M100, MPa), and tensile strength (MPa) ("Strength" in Tables 1 to 3) of the polyurethane films were measured in accordance with JIS K 7311.

(5) Sweat-Deterioration Resistance

After the polyurethane film was immersed in oleic acid at 80° C. for 70 hours, the tensile strength (MPa) of the polyurethane film was measured and a ratio of the tensile strength to the tensile strength (MPa) of the polyurethane film which was not immersed in oleic acid was shown as strength retaining ratio (%).

In this connection, since the deterioration characteristic of the polyurethane film by oleic acid resembles the deterioration characteristic of the polyurethane film induced by human sweat, the former deterioration characteristic is referred to as sweat-deterioration resistance herein.

(6) Hydrolysis Resistance

After the polyurethane film was immersed in an aqueous lactic acid solution (concentration: 1% by mass) at 132° C. for 5 hours, the tensile strength (MPa) thereof was measured and a ratio of the tensile strength to the tensile strength (MPa) of the polyurethane film which was not immersed in the aqueous lactic acid solution was shown as strength retaining ratio (%).

(7) Texture

Except that a Nylon taffeta was used instead of the polypropylene film, the heated isocyanate group-terminated urethane prepolymer was applied on the Nylon taffeta in a thickness of 25 μm and moisture curing was effected under an atmosphere of 20° C. and 60% RH for 5 days similarly to the preparation of the polyurethane film. The texture of the sample after the moisture curing of the isocyanate group-terminated urethane prepolymer was evaluated by hand touch. The evaluation was carried out based on the following standard.

A: Feeling is soft and preferable. That is, texture is excellent.

B: Feeling is slightly hard. That is, texture is slightly poor.

C: Feeling is very hard. That is, texture is poor.

The results of these evaluation tests are shown in Table 1, Table 2, and Table 3. The values of the polyisocyanate compound, polyol, and low-molecular-weight compound in Tables is shown as part(s) by mass.

[Table 1]

TABLE 1

|  |  | Example 1 | Example 2 | Example 3 | Example 4 |
|---|---|---|---|---|---|
| Raw material | Polyisocyanate compound |  |  |  |  |
|  | MDI | 133.8 | 153.5 | 162.6 | 145.3 |
|  | Polyol |  |  |  |  |
|  | PHC1000 | 183.1 | 242.5 | 269.9 | 177.3 |
|  | PHS3500 | 183.1 | 103.9 | 67.5 | — |
|  | PHS2000 | — | — | — | 177.3 |
|  | PHA4500 | — | — | — | — |
|  | PNA2000 | — | — | — | — |
|  | PBA3000 | — | — | — | — |
|  | Content of polyester polyol in polyols (% by mass) | 50 | 30 | 20 | 50 |
|  | Isocyanate group/hydroxyl group (molar ratio) | 2.2 | 2.2 | 2.2 | 2.2 |

TABLE 1-continued

|  |  | Example 1 | Example 2 | Example 3 | Example 4 |
|---|---|---|---|---|---|
| Isocyanate group-terminated urethane prepolymer | Content of isocyanate group (%) | 4.6 | 5.2 | 5.7 | 5.0 |
|  | Viscosity (mPa·s/60° C.) | 26500 | 34000 | 24300 | 21700 |
|  | Viscosity (mPa·s/125° C.) | 1400 | 1100 | 800 | 1000 |
|  | Melting point (° C.) | 53 | 51 | 55 | 51 |
| Evaluation results | Tensile properties |  |  |  |  |
|  | Elongation (%) | 370 | 360 | 330 | 410 |
|  | M100 (MPa) | 17.4 | 17.6 | 15.9 | 16.4 |
|  | Strength (MPa) | 46.4 | 58.3 | 62.4 | 47.3 |
|  | Sweat-deterioration resistance |  |  |  |  |
|  | Strength (MPa) | 16.5 | 30.1 | 37.1 | 22.6 |
|  | Strength retaining ratio (%) | 36 | 52 | 59 | 48 |
|  | Hydrolysis resistance |  |  |  |  |
|  | Strength (MPa) | 45.2 | 36.0 | 46.4 | 36.9 |
|  | Strength retaining ratio (%) | 97 | 62 | 74 | 78 |
|  | Texture |  |  |  |  |
|  | (coating thickness of adhesive layer 25 μm) | A | A | A | A |

[Table 2]

TABLE 2

|  |  | Comparative Example 1 | Comparative Example 2 | Comparative Example 3 |
|---|---|---|---|---|
| Raw material | Polyisocyanate compound |  |  |  |
|  | MDI | 125.8 | 147.1 | 135.3 |
|  | Polyol |  |  |  |
|  | PHC1000 | 187.1 | 176.5 | 182.3 |
|  | PHS3500 | — | — | — |
|  | PHS2000 | — | — | — |
|  | PHA4500 | 187.1 | — | — |
|  | PNA2000 | — | 176.5 | — |
|  | PBA3000 | — | — | 182.3 |
|  | Content of polyester polyol in polyols (% by mass) | 50 | 50 | 50 |
|  | Isocyanate group/hydroxyl group (molar ratio) | 2.2 | 2.2 | 2.2 |
| Isocyanate group-terminated urethane prepolymer | Content of isocyanate group (%) | 3.8 | 5.0 | 4.6 |
|  | Viscosity (mPa·s/60° C.) | 42200 | 17500 | 24800 |
|  | Viscosity (mPa·s/125° C.) | 2300 | 900 | 1400 |
|  | Melting point (° C.) | 44 | 47 | 40 |
| Evaluation results | Tensile properties |  |  |  |
|  | Elongation (%) | 420 | 400 | 420 |
|  | M100 (MPa) | 12.2 | 14.7 | 13.4 |
|  | Strength (MPa) | 51.7 | 48.0 | 50.0 |
|  | Sweat-deterioration resistance |  |  |  |
|  | Strength (MPa) | 35.6 | 28.4 | 46.1 |
|  | Strength retaining ratio (%) | 69 | 59 | 92 |
|  | Hydrolysis resistance |  |  |  |
|  | Strength (MPa) | 35.7 | 41.0 | 24.5 |
|  | Strength retaining ratio (%) | 69 | 85 | 49 |
|  | Texture | B | B | B |
|  | (coating thickness of adhesive layer 25 μm) |  |  |  |

[Table 3]

TABLE 3

| | | Comparative Example 4 | Comparative Example 5 | Comparative Example 6 | Comparative Example 7 |
|---|---|---|---|---|---|
| Raw material | Polyisocyanate compound | | | | |
| | MDI | 179.4 | 73.1 | 77.0 | 219.6 |
| | Polyol | | | | |
| | PHC1000 | 320.6 | — | — | 261.2 |
| | PHS3500 | — | 426.9 | — | — |
| | PHS2000 | — | — | — | — |
| | PHA4500 | — | — | — | — |
| | PNA2000 | — | — | — | — |
| | PBA3000 | — | — | 423.0 | — |
| | Content of polyester polyol in polyols (% by mass) | 0 | 100 | 100 | 0 |
| | Isocyanate group/hydroxyl group (molar ratio) | 2.2 | 2.2 | 2.2 | 3.3 |
| | Low-molecular-weight compound | | | | |
| | 1,5-Pentanediol | — | — | — | 19.2 |
| | Isocyanate group/hydroxyl group (molar ratio) | — | — | — | 2.0 |
| Isocyanate group-terminated urethane prepolymer | Content of isocyanate group (%) | 6.3 | 2.4 | 2.5 | 6.4 |
| | Viscosity (mPa·s/60° C.) | 32800 | >100000 | 46400 | no fluidity |
| | Viscosity (mPa·s/125° C.) | 1000 | 4900 | 3700 | 1200 |
| | Melting point (° C.) | liquid at room temperature | 61 | 51 | 92 |
| Evaluation results | Tensile properties | | | | |
| | Elongation (%) | 250 | 500 | 620 | 200 |
| | M100 (MPa) | 20.0 | 12.6 | 13.0 | 32.9 |
| | Strength (MPa) | 65.5 | 18.5 | 38.7 | 55.7 |
| | Sweat-deterioration resistance | | | | |
| | Strength (MPa) | 78.5 | 1.5 | 18.9 | 61.0 |
| | Strength retaining ratio (%) | 120 | 8 | 49 | 110 |
| | Hydrolysis resistance | | | | |
| | Strength (MPa) | 68.4 | 18.7 | 10.2 | 47.2 |
| | Strength retaining ratio (%) | 104 | 101 | 26 | 85 |
| | Texture | | | | |
| | (coating thickness of adhesive layer 25 μm) | C | A | A | A |

As shown in Table 1, Table 2, and Table 3, the isocyanate group-terminated urethane prepolymers of Examples 1 to 4 have a relatively low melt viscosity (50,000 mPa·s or less at 60° C. and 3,000 mPa·s at 125° C.) and exhibit good workability. Furthermore, the sweat-deterioration resistance and hydrolysis resistance are good (strength retaining ratio is 30% or more in both cases) and feeling is soft, that is, texture is good. Contrarily, Comparative Examples 1 to 3 show results of the cases where an adipic acid-based polyester polyol is used as a polyol component. Feeling is slightly hard, that is texture is slightly poor and thus it is slightly unsatisfactory as an adhesive for textile substrates. Moreover, in Comparative Example 4 wherein a polycarbonate polyol alone is used as the polyol component, feeling is very hard, that is, texture is poor. With regard to Comparative Examples 5 and 6 wherein a polyester polyol alone is used as the polyol component, as compared with Examples 1 to 4, the sweat-deterioration resistance is poor in Comparative Example 5 and the hydrolysis resistance is poor in Comparative Example 6. On the other hand, the isocyanate group-terminated urethane prepolymer of Comparative Example 7 which is chain-extended with a low-molecular-weight diol has a very high viscosity and is poor in coating workability to substrates.

From the foregoing results, it is found that the isocyanate group-terminated urethane prepolymers of the invention can be melted at relatively low temperature and also has a low melt viscosity, it can be thus applied thin on substrates with good workability, and also the adhesive after curing is excellent in sweat-deterioration resistance and hydrolysis resistance. Furthermore, in the case where the isocyanate group-terminated urethane prepolymer of the invention is used as an adhesive for textile substrates, texture of the adhered part after curing of the adhesive is found to be good.

While the invention has been described in detail and with reference to specific embodiments thereof, it will be apparent to one skilled in the art that various changes and modifications can be made therein without departing from the spirit and scope thereof.

The present application is based on Japanese Patent Application No. 2005-125131 filed on Apr. 22, 2005, and the contents thereof are herein incorporated by reference.

INDUSTRIAL APPLICABILITY

The isocyanate group-terminated urethane prepolymer of the present invention can be used as an adhesive which has flexible and good texture in the adhesion between porous water-permeable materials themselves, such as fabrics, porous plastic films, porous plastic film sheets, and porous plastic foams, or between the material and the other material and also which is excellent in hydrolysis resistance and sweat-deterioration resistance. The adhesive of the invention is suitable as an adhesive for textile substrates in the applications where durability is required, e.g., clothing, sports goods, shoes, and the like applications.

The invention claimed is:

1. A process for producing an isocyanate group-terminated urethane prepolymer, the process comprising
reacting polyols with a polyisocyanate compound;
wherein the polyols comprise
10 to 50% by mass, based on the total mass of the polyols, of a polyester polyol and
90 to 50% by mass, based on the total mass of the polyols, of a polycarbonate polyol; and
wherein a sebacic acid polyester polyol, which consists of a polycondensate of sebacic acid with a diol compound, accounts for 50 to 100% by mass of the polyester polyol, and
wherein the polyisocyanate compound and the polyols are reacted in such amounts that the ratio (by mol) of the isocyanate group/hydroxyl group is from 1.2:1 to 3.2:1, and
wherein the polyisocyanate compound is 4,4'-diphenylmethane diisocyanate.

2. The process according to claim 1, wherein the polyester polyol has a hydroxyl value-converted average molecular weight of 1,500 to 5,000.

3. The process according to claim 1, wherein the polycarbonate polyol has a hydroxyl value-converted average molecular weight of 600 to 1,500.

4. The process of claim 1, wherein the polyisocyanate compound and the polyols are reacted in such amounts that the ratio (by mol) of the isocyanate group/hydroxyl group is from 1.5:1 to 3.0:1.

5. The process of claim 1, wherein the polyisocyanate compound and the polyols are reacted in such amounts that the ratio (by mol) of the isocyanate group/hydroxyl group is from 1.8:1 to 2.5:1.

6. The process of claim 1, wherein the sebacic acid polyester polyol accounts for 75 to 100% by mass of the polyester polyol.

7. The process of claim 1, wherein the sebacic acid polyester polyol accounts for 90 to 100% by mass of the polyester polyol.

8. The process of claim 1, wherein the sebacic acid polyester polyol accounts for 100% by mass of the polyester polyol.

9. The process of claim 1, wherein the diol compound is 1,4-butane diol and/or 1,6-hexanediol.

10. The process of claim 9, wherein the diol compound is 1,6-hexane diol.

11. An isocyanate group-terminated urethane prepolymer, which is produced by the process according to claim 1 and has a melting point of from 40° C. to lower than 60° C. and a melt viscosity at 60° C. of 50,000 m·Pas or less.

12. An adhesive comprising the isocyanate group-terminated urethane prepolymer according to claim 11.

13. An adhesive comprising the isocyanate group-terminated urethane prepolymer according to claim 11 and an additive.

14. A two-component adhesive comprising: a first component comprising the isocyanate group-terminated urethane prepolymer according to claim 11; and a second component that is a curing agent component.

* * * * *